US006575864B1

(12) United States Patent
Dean

(10) Patent No.: US 6,575,864 B1
(45) Date of Patent: Jun. 10, 2003

(54) DRIVE MECHANISM FOR SELECTIVELY OPENING AND CLOSING A CLOSURE PANEL MANUALLY OR AUTOMATICALLY

(75) Inventor: Thomas Dean, Newmarket (CA)

(73) Assignee: Atoma International Corp, Newmarket (CA)

( * ) Notice: Subject to any disclaimer, the term of this patent is extended or adjusted under 35 U.S.C. 154(b) by 0 days.

(21) Appl. No.: 09/936,281

(22) PCT Filed: Mar. 8, 2000

(86) PCT No.: PCT/CA00/00249

§ 371 (c)(1), (2), (4) Date: Sep. 10, 2001

(87) PCT Pub. No.: WO00/53878

PCT Pub. Date: Sep. 14, 2000

Related U.S. Application Data

(60) Provisional application No. 60/123,519, filed on Mar. 8, 1999.

(51) Int. Cl.[7] ........................ F16H 19/04; F16H 19/08; E05F 15/00

(52) U.S. Cl. ................................ 475/5; 74/29; 74/625; 49/139; 49/280

(58) Field of Search .......................... 49/360, 139, 140, 49/279, 280; 475/5, 3, 4, 270; 74/29, 33, 30, 89.16, 625

(56) References Cited

U.S. PATENT DOCUMENTS 5,105,131 A * 4/1992 Schap ........................ 318/282
5,434,487 A * 7/1995 Long et al. ................. 318/280
5,515,748 A * 5/1996 Yagi ........................ 192/69.62
5,937,579 A * 8/1999 Baczewski et al. ........... 49/199
6,089,649 A * 7/2000 Hamada et al. ............. 292/201
6,134,837 A * 10/2000 Kawanobe et al. ........... 49/360

FOREIGN PATENT DOCUMENTS

| | | | | |
|---|---|---|---|---|
| EP | 0325320 | * 7/1989 | ........... | E05F/15/10 |
| JP | 2001200677 | * 7/2001 | ........... | E05F/15/14 |
| JP | 20001329748 | * 11/2001 | ........... | E05F/15/14 |
| WO | WO-9909282 | * 2/1999 | ........... | E05F/15/14 |

* cited by examiner

*Primary Examiner*—Sherry Estremsky
*Assistant Examiner*—Tisha D. Lewis
(74) *Attorney, Agent, or Firm*—Clark Hill PLC

(57) ABSTRACT

A drive mechanism (14) for enabling driving and manual movement of a sliding side door (12). The assembly (14) has a track assembly (16) mounted to a vehicle body (10) at a predetermined height and a drive mechanism (18) mounted to the sliding side door (12) so as to be proximate to a door latching mechanism (19). The drive mechanism (18) has an input drive motor (22) driving an output gear assembly (24) engaging the track assembly (16) and a transmission gear assembly (23) with a sliding gear (50) which selectively couples the input drive motor (22) and an input gear assembly (23) to the output gear assembly (24) between an engaged position for driving movement or disengaged position for manual movement of the sliding side door (12). In this way, the slide side door (12) may be moved manually between open and closed positions without having to overcome the effort required of rotating the drive motor (22).

7 Claims, 2 Drawing Sheets

DRIVE MECHANISM FOR SELECTIVELY OPENING AND CLOSING A CLOSURE PANEL MANUALLY OR AUTOMATICALLY

This application claims the benefit of Provisional application No. 60/123,519 filed Mar. 3, 1999.

TECHNICAL FIELD

This invention relates to an improved drive mechanism for opening and closing a closure panel. In particular, this invention relates to a drive mechanism for a sliding mini-van door.

BACKGROUND ART

Conventional systems for automatically opening and closing a sliding door in a vehicle include a power drive assembly for moving the door so that the door can be moved between a fully closed position and a fully open position. Examples of such systems are described in WO 97/44559; and U.S. Pat. Nos. 5,644,869; 5,536,061; 5,434,487; and 5,203,112.

In several of the examples of power sliding doors of the prior art, the drive assembly remains engaged even when the power is not activated. Thus when an operator wishes to manually open or close the door, the operator must overcome the drag produced by the drive assembly. In moving the door with the drive assembly engaged, the motor must be rotated in addition to all of the gears or other hardware of the drive assembly.

DISCLOSURE OF THE INVENTION

The disadvantages of the prior art may be overcome by providing a drive assembly for opening and closing a closure panel, wherein the drive assembly has a simple mechanism for engaging the drive effecting powered movement of the closure panel and disengaging the drive effecting low effort manual movement of the closure panel.

In accordance with the invention, there is provided a drive assembly for driving and manual movement of a sliding side door between open and closed positions on a vehicle body, the drive assembly having a track assembly mounted to the vehicle body and a drive mechanism mounted to the sliding side door for operatively engaging the track assembly, the drive mechanism having an input drive motor driving an output gear assembly for engaging the track assembly characterized in that the input drive motor is coupled to an input gear assembly, and a transmission gear assembly has a sliding gear which is selectively movable between an engaged position coupling the input gear assembly to the output gear assembly for driving movement of the sliding side door and a disengaged position where the output gear assembly is disengaged from the input drive motor for manual movement of the sliding side door.

The invention also provides for the transmission gear assembly to include an actuator motor, a gear train coupled to the actuator motor and engaging a lever pivotally connected for selectively moving the sliding gear between an engaged and a disengaged position.

In a preferred embodiment of the invention, the lever has three arms respectively coupled to the gear train, sliding gear, and a disengagement cable coupled to a latch release handle of the sliding side door so that the sliding gear is disengaged when a door latch is manually released.

In accordance with another aspect of the invention, the track assembly is mounted to the vehicle body at a predetermined height and the drive mechanism is mounted to the sliding side door so as to be proximate to the door latching mechanism.

DESCRIPTION OF THE DRAWINGS

In drawings which illustrate an embodiment of the invention.

DETAILED DESCRIPTION OF THE INVENTION

Figure 1:
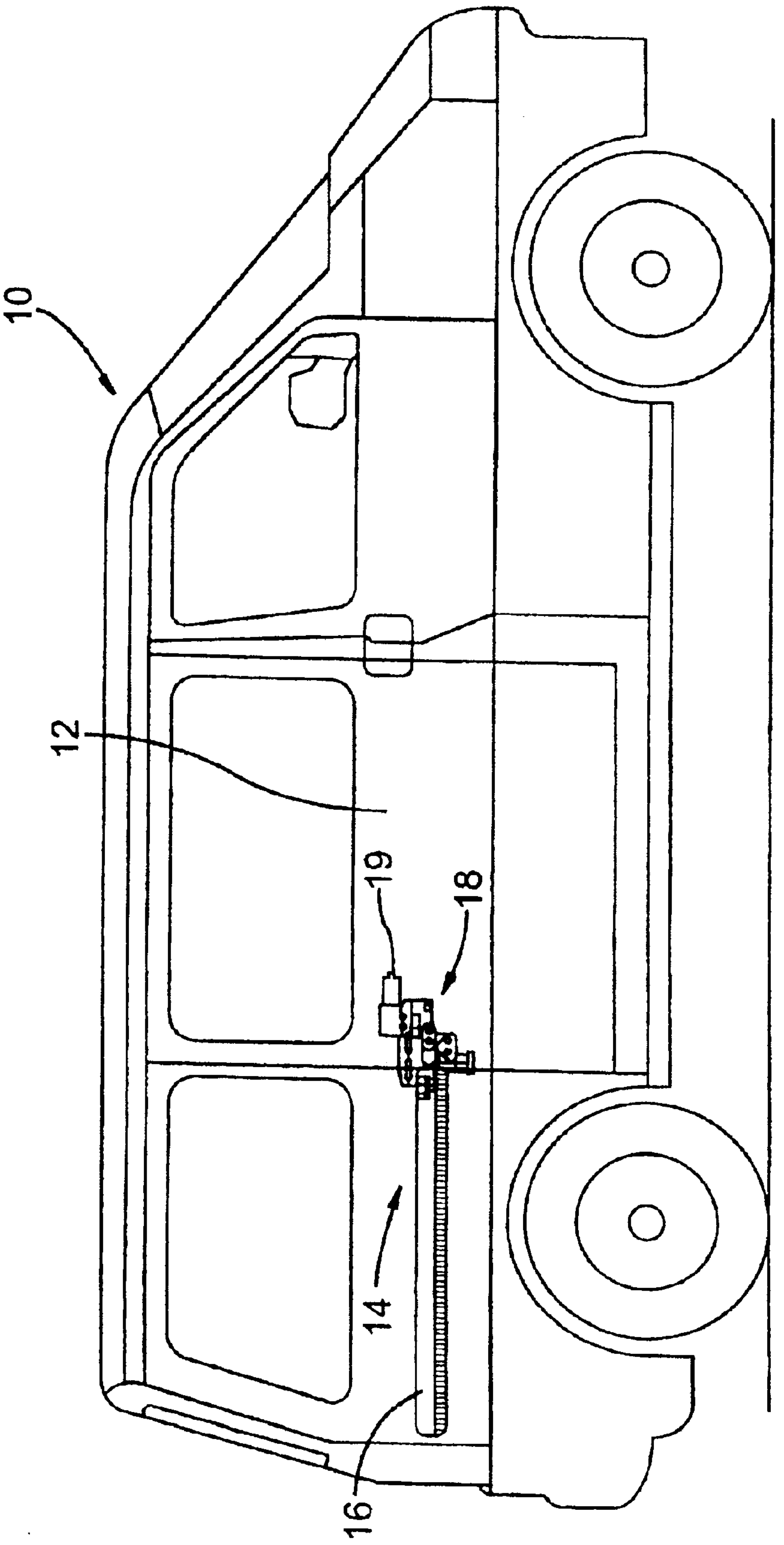
FIG. 1 is a side elevational view of a minivan incorporating the drive assembly of the present invention.

Referring to FIG. 1, there is illustrated a vehicle body 10 having a sliding side door 12. Sliding door 12 is conventionally mounted to the side of the vehicle 10 on suitable tracks for guided movement between a closed position wherein the door is substantially flush with the exterior surface of the vehicle 10 and an open position wherein the passengers of the vehicle 10 may pass. Although the right side of the vehicle is illustrated in the present embodiment, it is readily understood by those skilled in the art that the present invention applies equally to a left side sliding door.

The sliding side door 12 has a drive assembly 14 mounted between the body of the vehicle 10 and the sliding side door 12 for driving and manual movement of the sliding side door 12 between the open and closed positions. The drive assembly 14 generally comprises a track assembly 16 and a drive mechanism 18. The track assembly 16 is integrated in the rear quarter panel of the vehicle 10 and comprises a rack which extends generally in a longitudinal direction at a predetermined height above the wheel well. The drive mechanism 18 is mounted in the sliding side door 12 on the trailing edge of the door adjacent to a door latching mechanism 19 and operably engages the track assembly 16.

Figure 2:
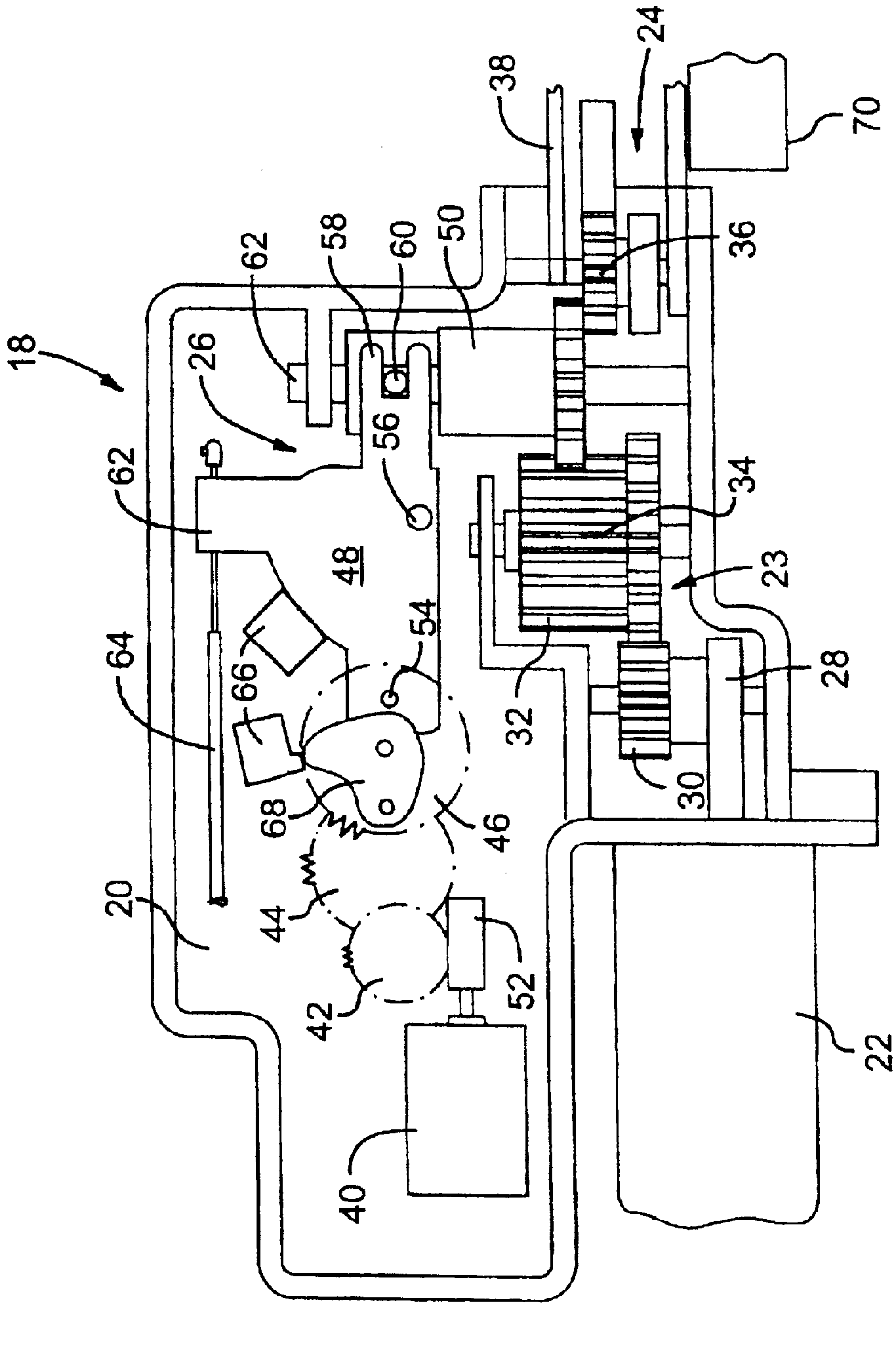
FIG. 2 is a side elevational view of a drive mechanism of the drive assembly of FIG. 1.

Referring to FIG. 2, drive mechanism 18 is illustrated in greater detail. Drive mechanism 18 has a housing 20 on which various input drive components are mounted. The drive mechanism 18 generally comprises an input drive motor 22, an input gear assembly 23, an output gear assembly 24 and a transmission gear assembly 26.

Input drive motor 22 is mounted to the housing 20 such that its drive shaft extends into the housing 20. Drive motor 22 is electrically connected to a source of electricity for driving in both a forward and rearward direction. A worm gear 28 is mounted on the drive shaft of drive motor 22.

Input gear assembly 23 comprises a pair of reduction gears 30 and 32. Each reduction gear 30, 32 is rotatably mounted to the housing 20. Reduction gear 30 drivingly engages with worm gear 28 and with reduction gear 32. Reduction gear 32 has an extended barrel portion having elongate teeth 34.

Output gear assembly 24 has a pinion gear 36 rotatably mounted to a hinge bracket 38. The hinge bracket 38 is coupled to the housing 20 and is operably connected with the track assembly 16.

Transmission gear assembly 26 generally comprises an actuator motor 40, a series of reduction gears 42, 44, 46, a lever 48 and a sliding gear 50. Actuator motor 40 is in driving engagement with the reduction gear 42. The actuator motor 40 has a worm gear 52 which drives reduction gear 42 which responsively drives reduction gears 44 and 46. Reduction gear 46 has a pin 54 which slidingly engages a first arm of the lever 48. The lever 48 is pivotally mounted to the housing 20 at pin 56. On a second arm opposite to the pinned connection with the reduction gear 46, the lever 48 has a fork 58 for slidingly engaging pin 60. Pin 60 extends radially from sliding gear 50. Sliding gear 50 is rotatably and slidably mounted on pin 62. The teeth of gears 50 and 36 preferably have rounded ends; rounded tooth ends allow the sliding gear 50 to smoothly re-engage with pinion gear 36 and reduction gear 34.

As is apparent, when actuator 40 rotates in a disengaging sense, lever 48 will responsively pivot about pin 56 such that sliding gear 50 will slide out of engagement with output pinion gear 36. When actuator motor 40 rotates in an opposite or engaging sense, lever 48 will responsively pivot about pin 56 such that sliding gear 50 will slide into engagement with output pinion gear 36.

Lever 48 has a third arm 62 which engages a disengagement cable in the form of a Bowden wire 64. Bowden wire 64 is operably connected with inner and outer latch release handles (not shown) of the sliding side door 12 and forming part of the latching mechanism 19. Operation of the latch release handles will responsively effect rotation of the lever 48 in a disengaging sense, moving the sliding gear 50 out of engagement with the output pinion gear 36 in the output drive gear assembly 24.

Additionally, housing 20 can have a series of switches 66 which are positioned to engage lever 48 and an L-shaped lever 68 fitted on gear 46. Switches 66 generate on and off signals to indicate the state or position of the lever 48 thereby signaling whether the sliding gear 50 is engaged so that the drive mechanism 18 may be operated safely and without undue strain on the gear assemblies 23, 24, 26.

Desirably, the drive mechanism 18 is associated with an encoder 70 which is mounted to the hinge bracket 38 so as to be as close as possible to the track assembly 16. The encoder 70 is coupled to the pinion gear 36 of the output gear assembly 24 and is adapted to signal the relative position of the sliding side door 12 to the track assembly 16 and the velocity at which the sliding side door 12 is traveling. The signals are transmitted to a programmed logic controller (PLC) so that the input drive motor 22 will stop and reverse if an obstacle, such as a body part, is encountered. The input drive motor 22 will also slow down for the last 200 mm of track when the sliding side door 12 is moved to a closed position. Further, the time and travel allowed between contacting an obstacle and reaching a maximum allowable pinch force may be adjusted in accordance with motor vehicle safety standards and optimized to compensate for wear in the gears over time.

In use, a controller will cause actuator motor 40 to rotate in an engaging sense. Lever 48 will responsively pivot, urging the sliding gear 50 to slide into engagement with the output pinion gear 36, thereby effecting a driving connection between the drive motor 22 and the output gear assembly 24. Rotation of the drive motor 22 will effect the opening and closing movement of the sliding door 12.

For manual opening and closing of the sliding door 12, the latch release handles are manipulated effecting a pull on Bowden wire 64. The lever 48 responsively rotates in a disengaging sense urging the sliding gear 50 to become disengaged from output pinion gear 36. The door may then be moved manually between the open and closed positions without having to overcome the effort of rotating the drive motor 22.

On the other hand, upon releasing the latch release handles, and moving the door to a fully open position, actuator motor 40 operates to restore lever 48 to an actuating position (as drawn) where sliding gear 50 engages pinion gear 36. In this way, the drive assembly 14 will hold the sliding side door 12 in the position where the door has come to rest and the door will not travel under its own weight if the vehicle has, for example, been parked on an incline.

It will also be appreciated that positioning the track assembly 16 on the vehicle body at a height commensurate with the door latching mechanism 19 provides an enormous advantage over those door closing systems where the track assembly is integrated into the lower end of the door opening portion of a vehicle body. With such an arrangement, it is not uncommon for automatic door operating systems to include door moving means to bring a door to a so-called "half-latch" position and additional door closing means to bring the door to a fully closed position, each with respective electric motors to produce the required motive power. In accordance with this invention, no auxiliary motive power is required to bring the door to a fully closed position because the input drive motor 22 is proximate to the door latching mechanism 19.

The above-described embodiment of the invention is intended to be an example of the present invention and alterations and modifications may be effected thereto, by those of skill in the art, without departing from the scope of the invention. In particular, it will be appreciated that the nature and configuration of the input gear assembly 23, output gear assembly 24, and transmission gear assembly 26 may vary considerably in accordance with accepted design considerations.

What is claimed is:

1. A drive assembly (14) for driving and manual movement of a sliding side door (12) between open and closed positions on a vehicle body (10), the drive assembly (14) having a track assembly (16) mounted to the vehicle body (10) and a drive mechanism (18) mounted to the sliding side door (12) and operatively engaging the track assembly (16), the drive mechanism (18) having an input drive motor (22) driving an output gear assembly (24) for engaging the track assembly (16) characterized by the input drive motor (22) being coupled to an input gear assembly (23), and a transmission gear assembly (26) having a sliding gear (50) which is selectively movable axially along a pin (62) between an engaged position coupling the input gear assembly (23) to the output gear assembly (24) for driving movement of the sliding side door (12) and a disengaged position where the output gear assembly (24) is disengaged from the input drive motor (22) for manual movement of the sliding side door (12), an actuator motor (40), and a gear train (42), (44), (46) coupled to the actuator motor (40) and engaging a lever (48) pivotally connected for selectively moving the sliding gear (50) between said engaged position and said disengaged position.

2. A drive mechanism assembly (14) according to claim 1 in which the transmission gear assembly (26) includes a disengagement cable (64) coupled to a latch release handle of the sliding side door (12) and adapted to pivot said lever (48) so as to disengage the sliding gear (50) from the input drive motor (22) for manual movement of the sliding side door (12) when a door latch is manually released.

3. A drive mechanism assembly (14) according to claim 1 in which the lever (48) has three arms extending outwardly from a pivot (56) for the lever (48) respectively coupled to gear train (42), (44), (46), sliding gear (50) and disengagement cable (64).

4. A drive mechanism assembly (14) according to claim 1 having signaling means (66), (68) signaling whether the transmission gear assembly (26) is in an engaged position or a disengaged position.

5. A drive mechanism assembly (14) according to claim 1 in which the track assembly (16) is mounted to the vehicle body (10) at a predetermined height to commensurate with a door latching mechanism (19) and the input drive motor (22) is proximate to said door latching mechanism (19).

6. A drive mechanism assembly (14) according to claim 1 having an encoder (70) mounted to a hinge bracket (38) housing the output gear assembly (24) and having signaling means for signaling the position and velocity of the sliding side door (12) relative to said track assembly (16).

7. A drive mechanism assembly (14) according to claim 2 in which the disengagement cable (64) is adapted to pivot said lever (48) so as to engage the sliding gear (50) to couple the input gear assembly (23) to the output gear assembly (24) and thereby arrest continued movement of the sliding side door (12) when the latch release handle is released.

* * * * *